(12) United States Patent
Jo et al.

(10) Patent No.: US 11,314,719 B2
(45) Date of Patent: Apr. 26, 2022

(54) METHOD FOR IMPLEMENTING CHANGE DATA CAPTURE IN DATABASE MANAGEMENT SYSTEM

(71) Applicant: SILCROAD SOFT, INC., Gyeonggi-do (KR)

(72) Inventors: Owook Jo, Gyeonggi-do (KR); Jeong Il Yoon, Gyeonggi-do (KR); Seunghun Kang, Gyeonggi-do (KR); Hyungdo Lee, Gyeonggi-do (KR)

(73) Assignee: SILCROAD SOFT, INC., Gyeonggi-do (KR)

( * ) Notice: Subject to any disclaimer, the term of this patent is extended or adjusted under 35 U.S.C. 154(b) by 0 days.

(21) Appl. No.: 16/965,282

(22) PCT Filed: Nov. 13, 2019

(86) PCT No.: PCT/KR2019/015429
§ 371 (c)(1),
(2) Date: Jul. 27, 2020

(87) PCT Pub. No.: WO2020/101343
PCT Pub. Date: May 22, 2020

(65) Prior Publication Data
US 2021/0271660 A1    Sep. 2, 2021

(30) Foreign Application Priority Data
Nov. 14, 2018 (KR) .......................... 10-2018-0139901

(51) Int. Cl.
*G06F 16/23* (2019.01)
*G06F 16/245* (2019.01)

(52) U.S. Cl.
CPC ........ *G06F 16/2358* (2019.01); *G06F 16/245* (2019.01)

(58) Field of Classification Search
CPC .......................... G06F 16/2358; G06F 16/245
See application file for complete search history.

(56) References Cited

U.S. PATENT DOCUMENTS 6,832,229 B2    12/2004   Reed
6,976,002 B1    12/2005   Ferguson et al.
(Continued)

FOREIGN PATENT DOCUMENTS

| JP | 2005527912 A | 9/2005 |
|---|---|---|
| JP | 2011258122 A | 12/2011 |
| KR | 1020180055952 A | 5/2018 |

*Primary Examiner* — Alicia M Willoughby
(74) *Attorney, Agent, or Firm* — Umberg Zipser LLP; Ryan Dean

(57) ABSTRACT

Disclosed is a computer program stored in a computer-readable storage including encoded commands. When the computer program is executed by one or more processors of a source database server, the computer program performs steps for Change Data Capture (CDC) by one or more processors. The steps may include: identifying a plurality of Structured Query Language (SQL) operations generated for one or more objects associated with a transaction by analyzing a log record including information about the transaction processed at a source database server; determining whether a previous SQL operation history for an object corresponding to an individual SQL operation is in a CDC file, based on whether an order in which the plurality of identified SQL operations occur; determining information to write on the CDC file based on whether a previous SQL operation history is in the CDC file; writing the determined information on the CDC file; and deciding to send the CDC file to a target database server.

13 Claims, 8 Drawing Sheets

(56) References Cited

U.S. PATENT DOCUMENTS

| | | | |
|---|---|---|---|
| 6,981,004 B2 | 12/2005 | Ganesh et al. |
| 6,999,977 B1 | 2/2006 | Norcott et al. |
| 7,065,538 B2 | 6/2006 | Aronoff et al. |
| 7,111,023 B2 | 9/2006 | Norcott |
| 7,461,103 B2 | 12/2008 | Aronoff et al. |
| 7,647,354 B2 | 1/2010 | Norcott |
| 7,657,576 B1 | 2/2010 | Norcott |
| 7,668,878 B2 | 2/2010 | Arora et al. |
| 7,831,574 B2 | 11/2010 | Pareek et al. |
| 7,908,243 B2 | 3/2011 | Mishra |
| 8,385,657 B2 | 2/2013 | Basri et al. |
| 8,510,270 B2 | 8/2013 | Pareek et al. |
| 8,676,759 B1 | 3/2014 | Zhu et al. |
| 8,799,213 B2 | 8/2014 | Wong et al. |
| 8,874,506 B2 | 10/2014 | Goetsch |
| 9,009,104 B2 | 4/2015 | Wong et al. |
| 9,047,392 B2 | 6/2015 | Wilkes et al. |
| 9,230,002 B2 | 1/2016 | Wong et al. |
| 9,298,878 B2 | 3/2016 | Guirguis et al. |
| 9,442,995 B2 | 9/2016 | Pareek et al. |
| 9,495,252 B2 | 11/2016 | Zhu et al. |
| 9,646,042 B2 | 5/2017 | Bengali et al. |
| 9,727,624 B2 | 8/2017 | Zhu |
| 9,841,909 B2 | 12/2017 | Zhu et al. |
| 2003/0225798 A1 | 12/2003 | Norcott |
| 2011/0191299 A1 | 8/2011 | Huu et al. |
| 2012/0185432 A1* | 7/2012 | Ding ................ G06F 16/273 707/620 |
| 2014/0304229 A1* | 10/2014 | Zhu .................. G06F 16/27 707/634 |
| 2015/0032689 A1* | 1/2015 | Raghunathan ...... G06F 16/27 707/610 |
| 2016/0314147 A1 | 10/2016 | Romine |
| 2017/0011087 A1 | 1/2017 | Hyde et al. |
| 2017/0255529 A1* | 9/2017 | Kedia ................ G06F 16/27 |
| 2018/0081924 A1 | 3/2018 | Johnston |
| 2019/0102419 A1* | 4/2019 | Singh ............ G06F 16/2358 |
| 2019/0188091 A1* | 6/2019 | Christiansen ...... G06F 3/0613 |
| 2019/0303470 A1* | 10/2019 | Lee ............... G06F 16/2282 |
| 2019/0332582 A1* | 10/2019 | Kumar ............. G06F 16/273 |
| 2019/0361913 A1 | 11/2019 | Yoon et al. |

\* cited by examiner

【Figure 1】
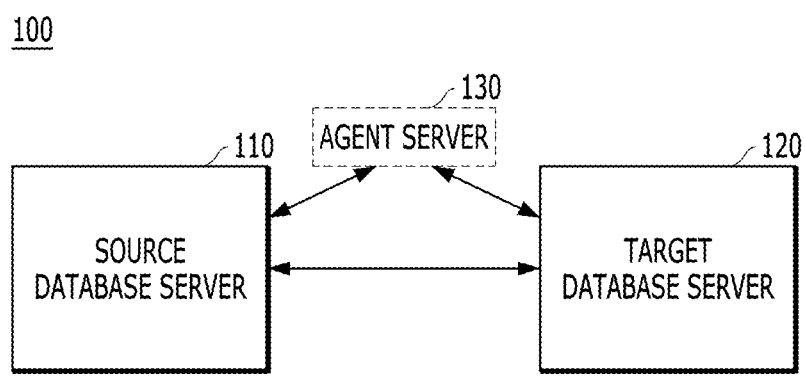

[Figure 2]
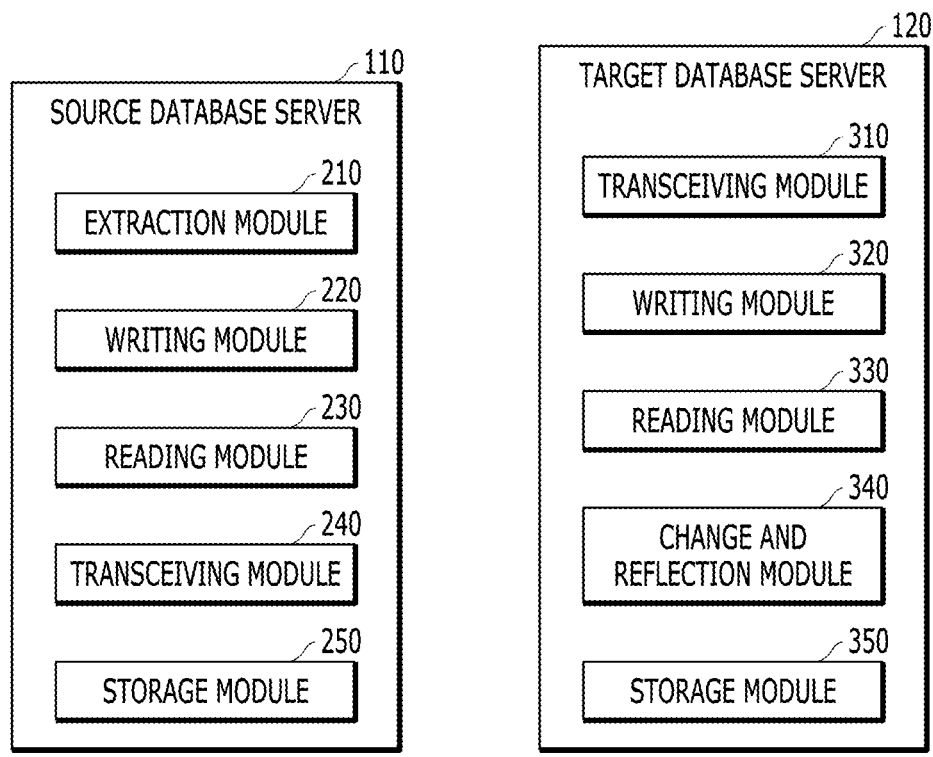

【Figure 3】
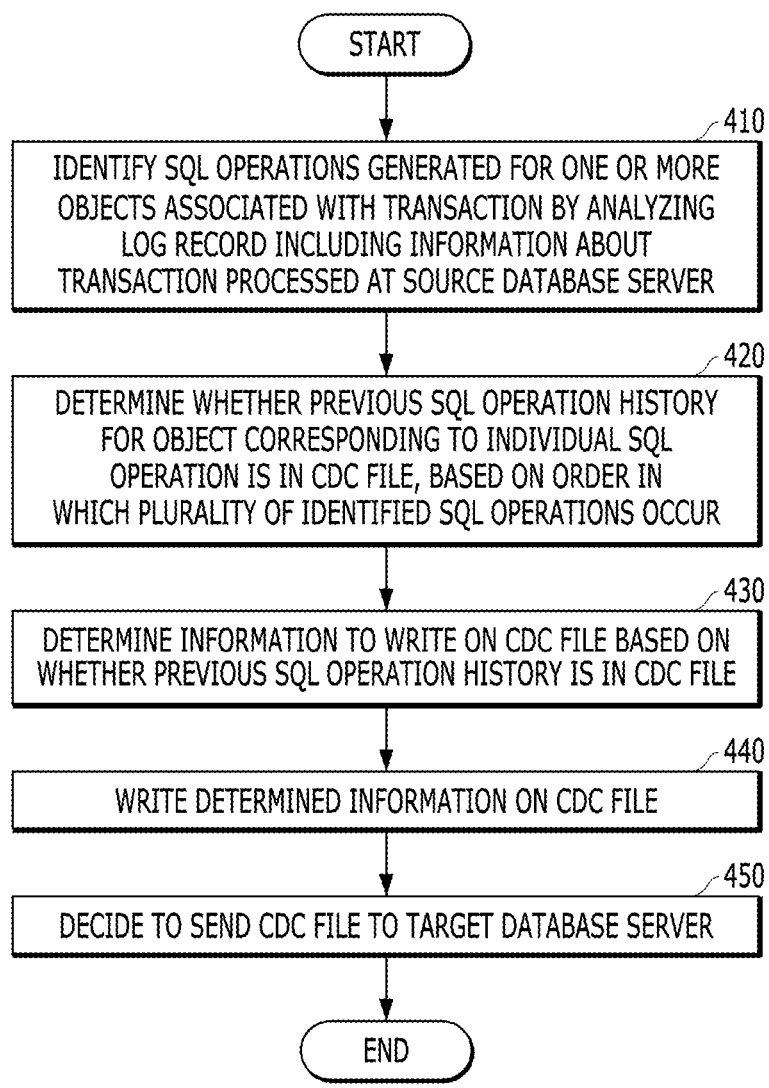

【Figure 4】
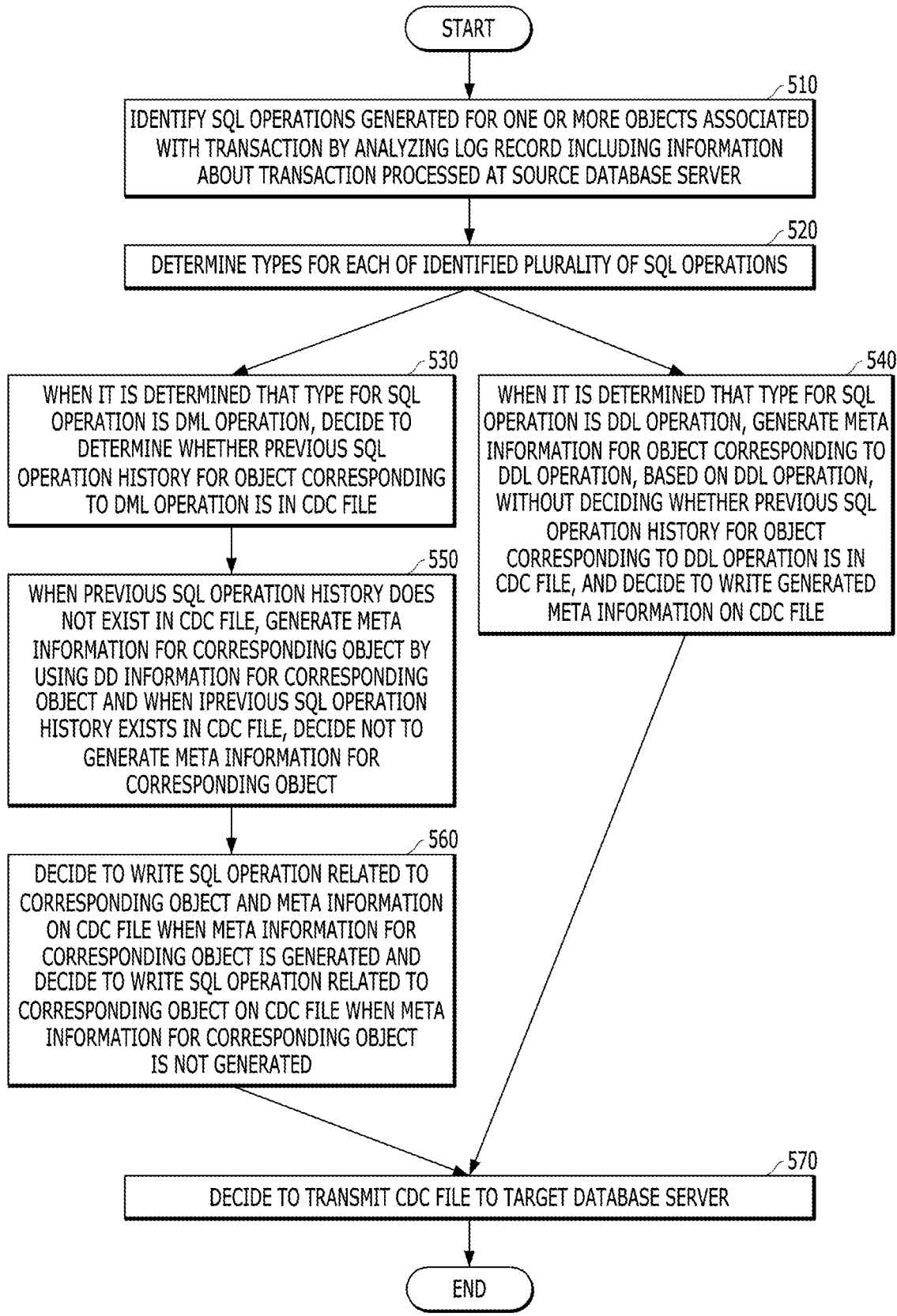

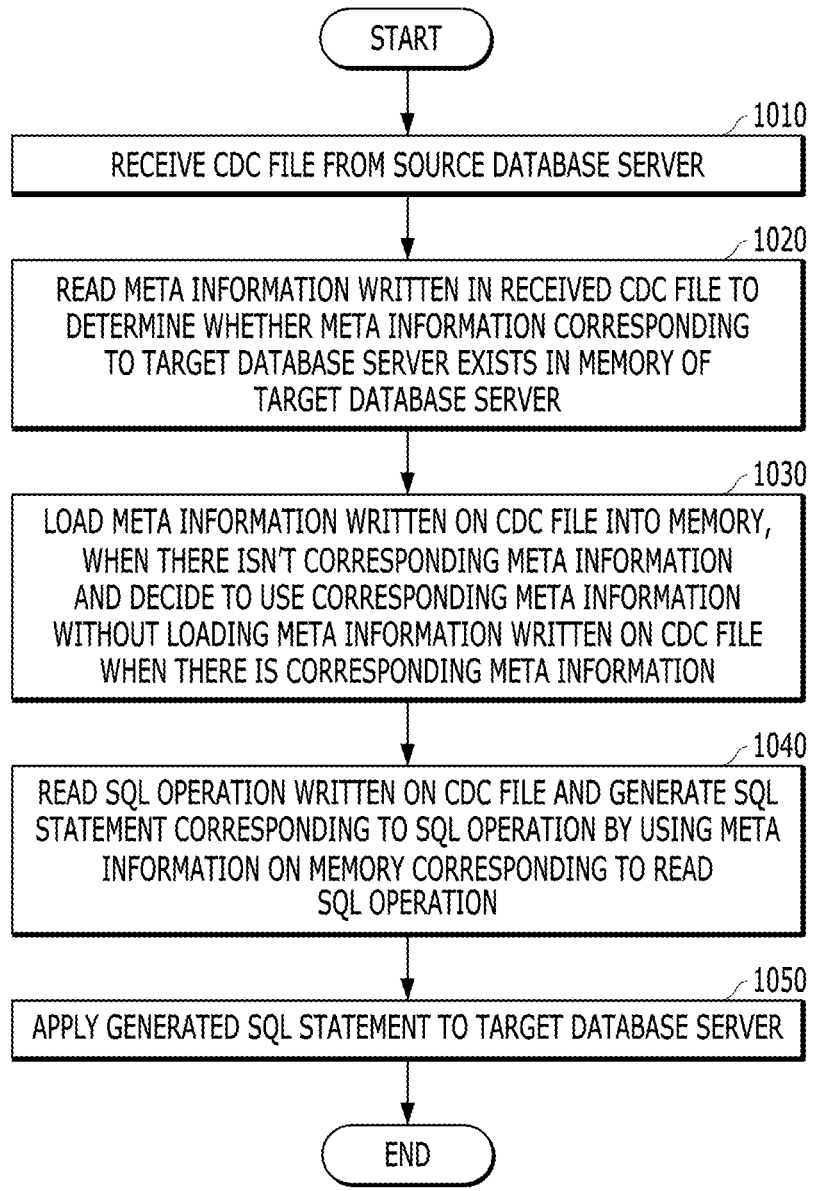
[Figure 5]

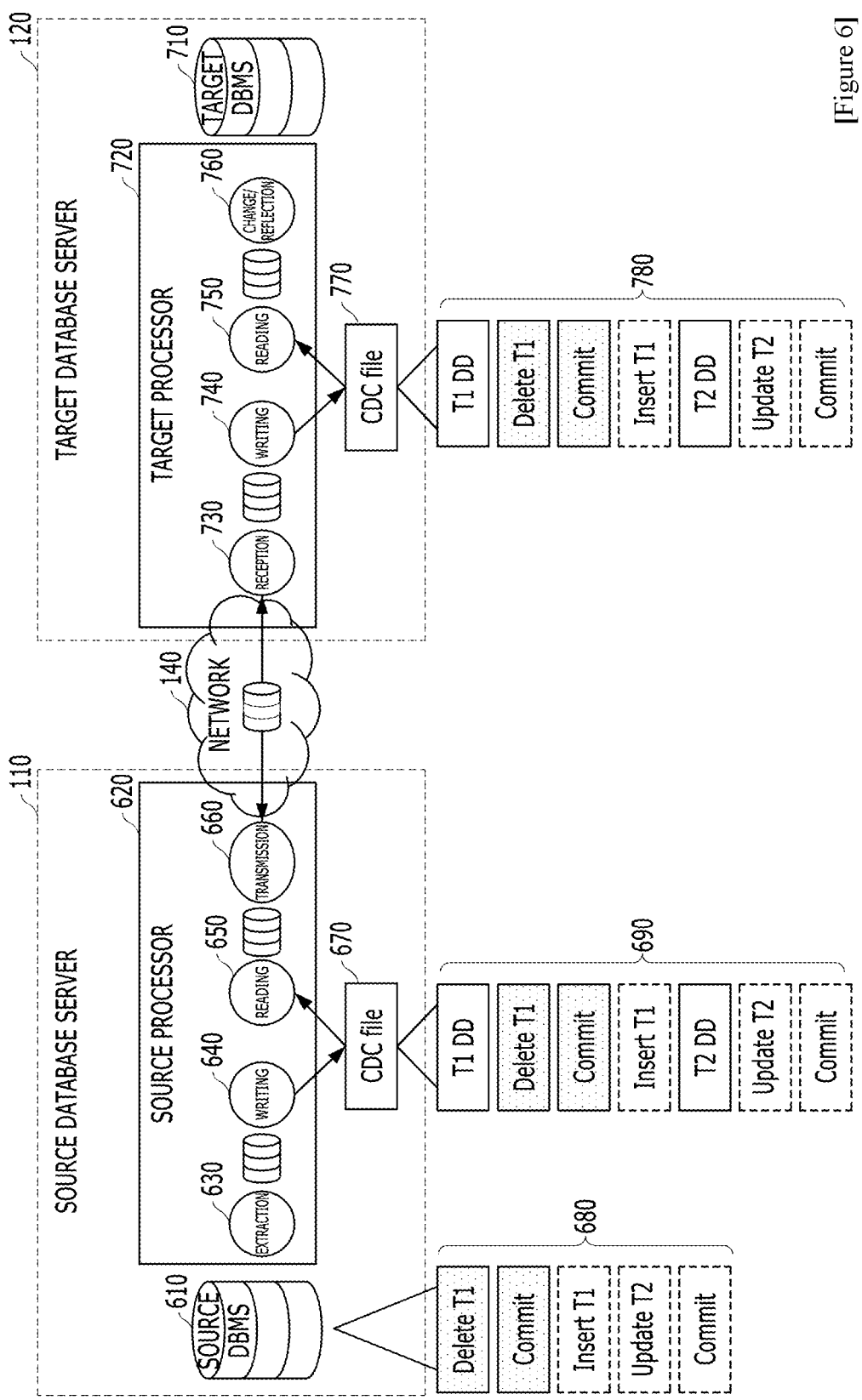
[Figure 6]

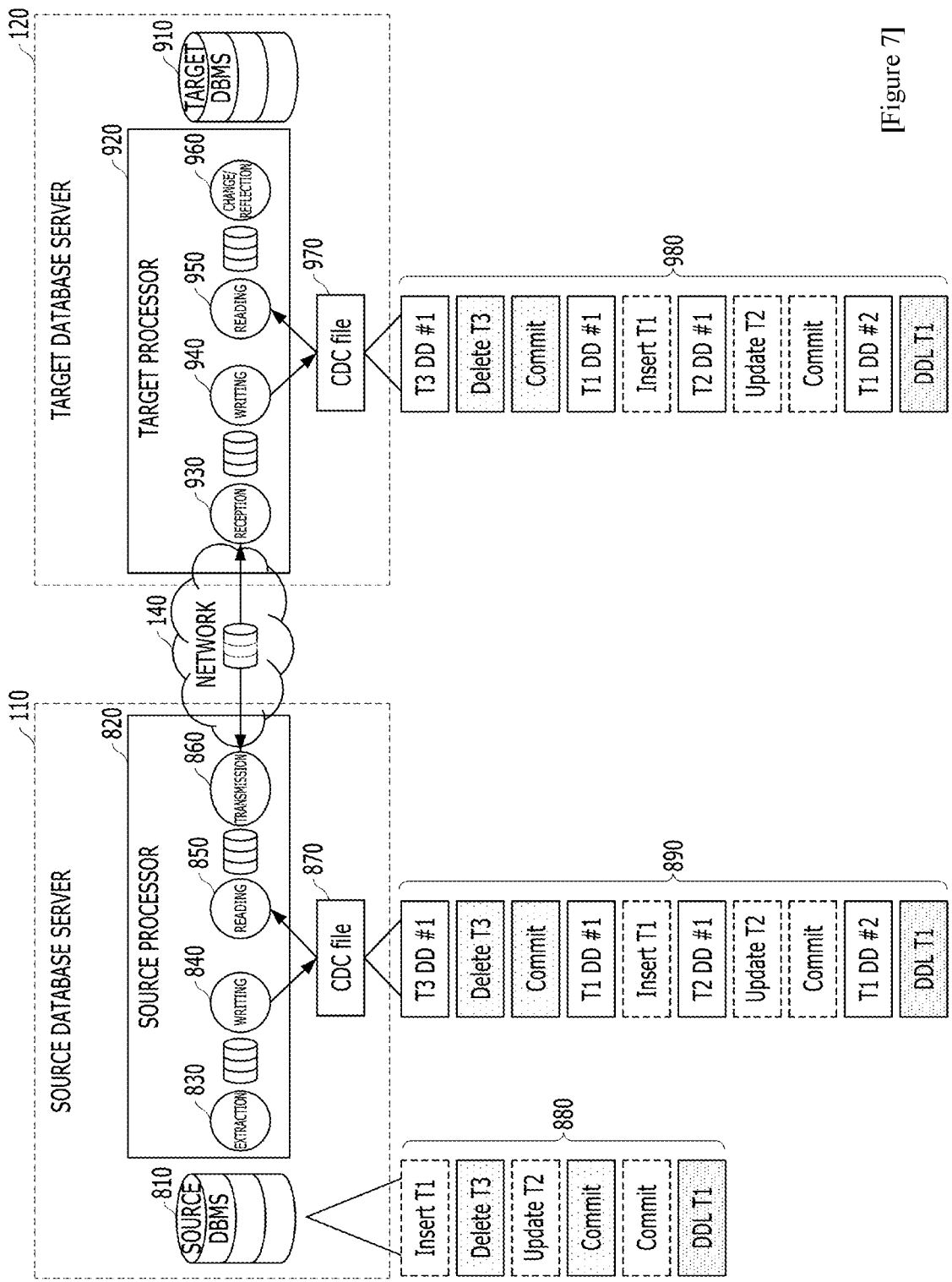
[Figure 7]

【Figure 8】
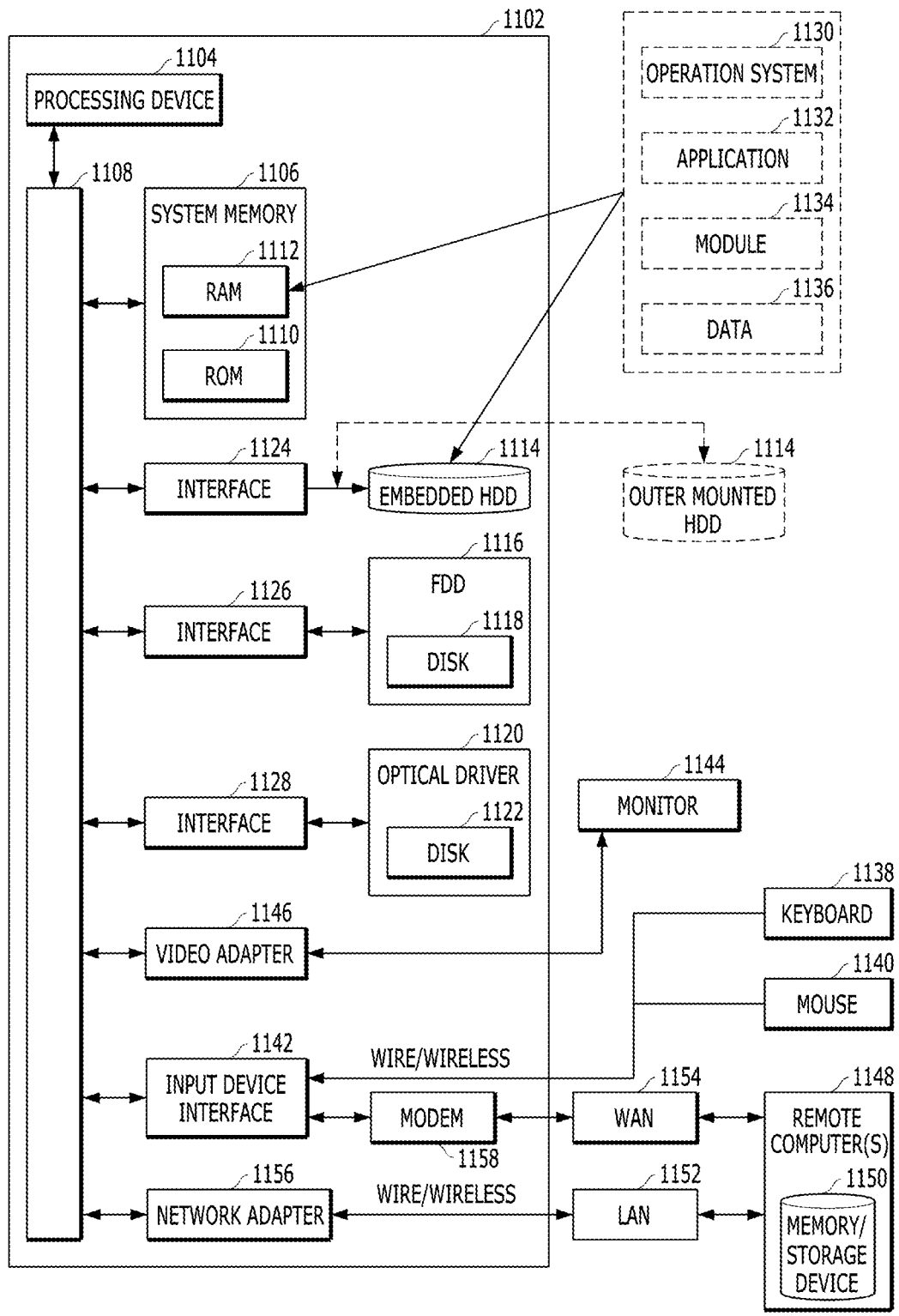

METHOD FOR IMPLEMENTING CHANGE DATA CAPTURE IN DATABASE MANAGEMENT SYSTEM

TECHNICAL FIELD

The present disclosure relates to a database management system (DBMS), and more particularly, to change data capture (CDC).

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, research is continued on databases to solve problems of high performance, high availability, and scalability which are foundations of corporate business implementation.

Data managed in the enterprises often need to be migrated or duplicated from a source location to a target location, and managed. For example, a database system for implementing a banking business may be classified into a database that may be accessed simultaneously by multiple external customers and a database that may be accessed by internal employees, depending on the characteristics of the client which accesses the database. A solution that transfers change data from a source database system to a target database system is called Change Data Capture (CDC). The CDC may be implemented, for example, by reading and interpreting log files in the source database system and replaying the change data in the source database system to the target database system to be replicated.

If data backup or data consolidation tasks are performed, massive amounts of data should be handled. If only recently changed data from an original source database system is selected and moved to another target database system, the load on the system can be reduced, and the productivity of the overall operation can be improved. In particular, in the case of data integration or data warehouse work that regularly extracts a large amount of data from one system and moves it to another system, using CDC technology can significantly reduce the time required to extract and move data. In addition, in the case of a business system that requires a 24-hour operation, if CDC technology is used, real-time backup and data integration may be possible without downtime.

Furthermore, in implementing query offloading to improve database performance, for example, only write/update is allowed in a master database, and at least part of the data in the master database is replicated in a staging database and then, data replicated to N slave databases are copied and transferred. When using such query offloading, a write logic for the database is performed in the master database and a read logic can be performed in the slave database, so that separation according to the type of transaction can be possible. Accordingly, the performance of the database may be improved, such as an increase in the throughput of the database.

For the above reasons, major database companies are continuously developing products for CDC solutions currently.

Schemes for implementing the CDC may include, for example, a row timestamp scheme, a row version scheme, a lock scheme a row state indicator scheme, a table trigger scheme, and an event programming scheme.

In particular, in a CDC solution, synchronization should be performed between both databases to maintain data integrity among a plurality of database systems. However, to implement such synchronization, overhead for database resources may be incurred.

Prior art documents of the present disclosure are as follows.
(Patent Document 1) U.S. Pat. No. 6,999,977
(Patent Document 2) U.S. Pat. No. 7,111,023
(Patent Document 3) U.S. Pat. No. 7,657,576
(Patent Document 4) U.S. Pat. No. 7,647,354
(Patent Document 5) U.S. Pat. No. 9,727,624
(Patent Document 6) U.S. Pat. No. 9,442,995
(Patent Document 7) U.S. Pat. No. 8,510,270
(Patent Document 8) U.S. Pat. No. 9,298,878
(Patent Document 9) U.S. Pat. No. 7,461,103
(Patent Document 10) U.S. Pat. No. 7,065,538
(Patent Document 11) U.S. Pat. No. 7,668,878
(Patent Document 12) U.S. Pat. No. 6,832,229
(Patent Document 13) U.S. Pat. No. 8,799,213
(Patent Document 14) U.S. Pat. No. 9,230,002
(Patent Document 15) U.S. Pat. No. 9,009,104
(Patent Document 16) U.S. Pat. No. 6,981,004
(Patent Document 17) U.S. Pat. No. 6,976,022
(Patent Document 18) U.S. Pat. No. 7,908,243
(Patent Document 19) U.S. Pat. No. 9,841,909
(Patent Document 20) U.S. Pat. No. 9,495,252
(Patent Document 21) U.S. Pat. No. 8,676,759
(Patent Document 22) U.S. Pat. No. 9,646,042
(Patent Document 23) U.S. Pat. No. 9,047,392
(Patent Document 24) U.S. Pat. No. 7,831,574
(Patent Document 25) U.S. Pat. No. 8,874,506
(Patent Document 26) U.S. Pat. No. 8,385,657
(Patent Document 27) US Patent Publication No. US2016-0314147
(Patent Document 28) US Patent Publication No. US2018-0081924

DISCLOSURE

Technical Problem

Embodiments of the present disclosure are to efficiently implement Change Data Capture (CDC) without stopping a DB.

Embodiments of the present disclosure are to efficiently manage a memory in a target DB.

Technical Solution

Disclosed is a computer program stored in a computer-readable storage medium including encoded commands according to an embodiment of the present disclosure. When the computer program is executed by one or more processors of a source database server, the computer program performs a method for Change Data Capture (CDC) by one or more processors. The method may include: identifying a plurality of Structured Query Language (SQL) operations generated for one or more objects associated with a transaction by analyzing a log record including information about the transaction processed at a source database server; determining whether a previous SQL operation history for an object corresponding to an individual SQL operation is in a CDC file, based on an order in which the identified SQL operations occur; determining information to write on the CDC file based on whether a previous SQL operation history is in the CDC file; writing the determined information on the CDC file; and deciding to send the CDC file to a target database server.

Disclosed is a database server including one or more processors to implement Change Data Capture (CDC) according to an embodiment of the present disclosure. The database server may include a source database server or a predetermined type of agent server which exists between the source database server and a target database server. The one or more processors may perform identifying a plurality of Structured Query Language (SQL) operations generated for one or more objects associated with a transaction, by analyzing a log record including information about the transaction processed at a source database server; determining whether a previous SQL operation history for an object corresponding to an individual SQL operation is in a CDC file, based on the order in which whether the identified SQL operations occur; determining information to write on the CDC file based on whether a previous SQL operation history is in the CDC file; writing the determined information on the CDC file; and deciding to send the CDC file to a target database server.

Disclosed is a computer program stored in a non-transitory computer readable storage medium comprising encoded instructions. When the computer program is executed by one or more processors, the computer program performs a method for Change Data Capture (CDC) by one or more processors. The method may include: receiving a CDC file from a source database server; deciding whether there is a meta information corresponded to a target database server, by reading a meta information written on the CDC file; loading a meta information written on the CDC file into a memory, when there isn't the corresponded meta information; reading an SQL operation written on the CDC file, and generating a SQL statement corresponding to the SQL operation by using the meta information corresponding to the read SQL operation in the memory; and applying the generated SQL statement to the target database server.

Disclosed is a database server including one or more processors to implement Change Data Capture (CDC) according to an embodiment of the present disclosure. The database server may include a target database server or a predetermined type of agent server which exists between a source database server and the target database server. The one or more processors may perform: receiving a CDC file from a source database server; deciding whether there is a meta information corresponded to a target database server, by reading a meta information written on the CDC file; loading a meta information written on the CDC file into a memory, when there isn't the corresponded meta information; reading an SQL operation written on the CDC file and generating an SQL statement corresponded to the SQL operation by using the meta information corresponded to the read SQL operation in the memory; and applying the generated SQL statement to the target database server.

Advantageous Effects

According to an embodiment of the present disclosure, change data capture (CDC) can be efficiently implemented without stopping a DB.

According to an embodiment of the present disclosure, a memory can be efficiently managed in a target DB.

DESCRIPTION OF DRAWINGS

Various embodiments will be described concerning the drawings, in which like reference numbers are used collectively to refer to similar components or similar modules. In the following embodiments, for description, multiple specific detailed matters are presented for a general understanding of one or more embodiments. However, such embodiment(s) may be carried out without specific detailed matters. In other examples, known structures and apparatuses are illustrated in a block diagram form to facilitate a description of one or more embodiments.

FIG. 1 exemplarily illustrates a database system according to an embodiment of the present disclosure.

FIG. 2 exemplarily illustrates a source database server and a target database server in a database system according to an embodiment of the present disclosure.

FIG. 3 is a flowchart exemplarily showing a CDC method performed in a source database server (or agent server) according to an embodiment of the present disclosure.

FIG. 4 is a flowchart exemplarily showing a CDC method performed in a source database server (or agent server) according to an embodiment of the present disclosure.

FIG. 5 is a flowchart exemplarily showing a CDC method performed in a target database server (or agent server) according to an embodiment of the present disclosure.

FIG. 6 schematically illustrates CDC operations performed in a database system according to an embodiment of the present disclosure.

FIG. 7 schematically illustrates CDC operations performed in a database system according to an embodiment of the present disclosure.

FIG. 8 is a block diagram of an exemplary computing device for implementing a CDC solution according to an embodiment of the present disclosure.

BEST MODE

Various embodiments and/or aspects will be now disclosed about the drawings. In the following description, for description, multiple detailed matters will be disclosed to help a comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of the various methods in principles of various aspects may be used and the descriptions are intended to include all of the aspects and equivalents thereof.

Further various aspects and features will be presented by a system that can include multiple devices, components, and/or modules. It should also be appreciated and recognized that various systems can include additional apparatuses, components, and/or modules and/or that the various systems cannot include all of the apparatuses, components, modules, and the like discussed in association with the drawings.

In "embodiment", "example", "aspect", "illustration", and the like used in this specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, and the software.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the cases where X uses A, the case where X uses B, or the case where X uses both A and B. Further, it should be understood that the term "and/or" used in this specification designates and includes all available combinations of one or more items among enumerated related items.

In addition, the word "comprises" and/or "comprising" means that the corresponding feature and/or component is present, but it should be appreciated that the presence or addition of one or more other features, components, and/or a group thereof is not excluded. Further, when not separately specified or it is not clear in terms of the context that a singular form is indicated, it should be construed that the singular form generally means "one or more" in this specification and the claims.

The computer readable medium in this specification may include all kinds of storage media storing programs and data to be readable by the computer system. According to an aspect of the present disclosure, the media may include a read only memory (ROM), a random access memory (RAM), a compact disk (CD)-ROM, a digital video disk (DVD)-ROM, a magnetic tape, a floppy disk, an optical data storage device, and the like. Additionally, the media are distributed to systems connected through a network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in this specification and claims should be interpreted as meanings and concepts which match the technical spirit of the present disclosure based on a principle in which the inventor can define appropriate concepts of the terms to describe his/her invention by the best method.

FIG. 1 is a schematic view of a database system 100 according to an embodiment of the present disclosure.

As illustrated in FIG. 1, the database system 100 may include a source database server 110, a target database server 120, and/or an agent server 130.

Although not illustrated in FIG. 1, the database system 100 may further include a client. The client may mean a predetermined type of node(s) in a system having a mechanism for communication with the database servers. For example, the client may include a predetermined electronic device having connectivity with a personal computer (PC), a laptop computer, a workstation, a terminal, and/or the network. Further, the client may include a predetermined server implemented by at least one of agent, application programming interface (API), and plug-in.

In an embodiment of the present disclosure, operations of the source data server 110, the target database server 120, and/or the agent server 130 to be described below may be performed according to a query issued from the client.

The database servers 110 and 120 may include a predetermined type of computer system or computer device such as a microprocessor, a mainframe computer, a digital single processor, a portable device, and a device controller. Although not illustrated, each of the database servers 110 and 120 computing device 110 may include a data management system (DBMS) and/or persistent storage.

The source database server 110 and the target database server 120 in this specification may refer to a predetermined type of node in the database system 100. As an additional embodiment, the source database server 110 and the target database server 120 are integrated into one database server to be managed and/or clustered. The source database server 110 and the target database server 120 are integrated into one database server to constitute multiple databases that are associated with each other.

In an embodiment of the present disclosure, the source database server 110 and the target database server 120 may refer to heterogeneous database servers which are located remote from each other. Moreover, in FIG. 1, two database servers are illustrated, but more than database servers may also be included in the scope of the present disclosure.

Although not illustrated in FIG. 1, the database servers 110 and 120 may include one or more memories including a buffer cache. Further, although not illustrated in FIG. 1, the database servers 110 and 120 may include one or more processors. Therefore, the DBMS in the database server may be operated by the processor on the memory.

Here, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by a processor. The memory may store a data table including a data value and/or log records depending on a transaction. For example, the log records may be stored in a separate component that which is responsible for storing a separate transaction log of the memory. The transaction in this specification may generally mean consecutive processing units for a series of tasks such as exchange of information or database update. The transaction represents a basic unit of a task for completing a requested task while the integrity of the database is guaranteed. In the present disclosure, the log record may mean a record for a redo log and include data records to identify changes (e.g., changes related to tables, columns, rows, data types, indexes, etc.) of a structure, and an organization of data in a database.

In an embodiment of the present disclosure, the data value of the data table and/or the log records may be recorded in a persistent storage from the memory. In an additional aspect, the memory may include the buffer cache, and the data and/or log records may be stored in a block of the buffer cache. The data and/or log records may be recorded in the persistent storage by a background process.

The persistent storage in the database server means a non-volatile storage medium which may consistently store predetermined data, such as a magnetic disk, an optical disk, and a magneto-optical storage device and a storage device based on a flash memory and/or a battery-backup memory. The persistent storage may communicate with the processors and the memories of the database servers 110 and 120 through various communication means. In an additional embodiment, the persistent storage is positioned outside the database servers 110 and 120 and may communicate with the database servers 110 and 120.

The DBMS as a program for permitting the database server 120 to perform operations including retrieval, insertion, modification, deletion, and/or log record management of required data in the database servers 110 and 120 may be implemented by the processors in the memory of the database servers 110 and 120 as described above.

The client and the database servers 110 and 120 or the database servers 110 and 120 may communicate with each other through a network (not illustrated). The network according to an embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. As an additional embodiment, the network in this specification may include a database link (dblink), and as a result, the database servers 110 and 120 communicate with each other through the database link to fetch data/log records therefrom or from another database server. The techniques described in this specification may also be used in other networks in addition to the aforementioned networks.

As illustrated in FIG. 1, the source database server 110 may be located remotely from the target database server 120. Further, the source database server 110 and the target database server 120 may mean servers of the same type or heterogeneous database servers which are not compatible with each other.

Additionally, the source database server 110 as a predetermined type of database may include a device including a processor and a memory for executing and storing commands, but is not limited thereto. That is, the source database may include software, firmware, and hardware, or a combination thereof. The software may include an application(s) for generating, deleting, and modifying database tables, schemas, indexes, and/or data. The source database server 110 may receive transactions from the client or another computing device and exemplary transactions may include retrieving, adding, modifying, and/or deleting the data, the table, and/or the index in the source database server 110.

The target database server 120 may mean a database server in which data change contents generated in the source database server 110 are replicated or synchronized and include at least some of the features of the source database server 110. For example, the target database server 120 may store copies of data, data types, tables, indexes, and log records of the source database server 110.

The log record in this specification may mean a data record capable of identifying change contents for a structure and an organization for the data in the database and/or change contents related to the table, a column, the data type, the index, the data, etc. The log record may mean information for uniquely identifying a transaction or operation and/or information for identifying a data record changed according to the transaction or operation.

In an embodiment of the present disclosure, the agent server 130 may mean a separate entity for implementing CDC between the source database server 110 and the target database server 120. Accordingly, the agent server 130 may perform predetermined operations for implementing CDC features. For example, the agent server 130 receives and processes data from the source database server 110 in the present disclosure and then transmits the received and processed data to the target database server 120 to allow changed data to be applied in the target database server 120.

The agent server 130 as a predetermined type of server may include the device including the processor and the memory for executing and storing the commands, but is not limited thereto. The agent server 130 may include software, firmware, and hardware, or a combination thereof. For example, software for implementing operations of the agent server 130 may be installed in the source database 110 and/or the target database 120. For example, the agent server 130 may operate as a predetermined type of CDC module. In such an example, the CDC module is installed in the source database server 120 and/or the target database server 130 to allow the CDC features between the source database server 120 and the target database server 130 to be implemented.

Functions of the agent server 130 illustrated in FIG. 1 may be integrated as part of the source database server 110 and/or the target database server 120. For example, a CDC function of the agent server 130 may be replaced by the target database server 120.

FIG. 2 exemplarily illustrates a source database server 110 and a target database server 120 in a database system 100 according to an embodiment of the present disclosure.

The components of the database servers 110 and 120 illustrated in FIG. 2 are exemplary and additional components may exist or some of the components may be omitted or integrated.

As illustrated in FIG. 2, the source database server 110 may include an extraction module 210, a writing module 220, a reading module 230, a transceiving module 240, and a storage module 250. The aforementioned modules may mean an aggregate for functions performed by one or more processors of the source database server 110. Further, the operations and functions performed by the aforementioned modules may be performed by one or more threads or processes.

The extraction module 210 may acquire a log record including information on the transaction processed by the source database server 110. The extraction module 210 may receive a redo log from the source database server 110 or access the redo log of the source database server 110. When the data, the table, and/or the index are/is changed in the source database server 110 according to the transaction initiated by the client, the log record for the corresponding transaction may be written in the source database server 110. In this case, the extraction module 210 checks and analyzes the redo log for the transaction written in a log buffer and/or a log file in the source database server 110 to acquire the log record for the change data. In this case, the extraction module 210 may extract only changed data by analyzing the redo log. The extraction module 210 may analyze the extracted log record based on one or more rules or a predetermined type of deep learning algorithm.

Additionally, the extraction module 210 may align the log records based on an order according to generation times of the log records. For example, the extraction module 210 may align the log records based on a system change number (SCN). That is, the writing module 210 may align the log records of the source database server 110 in time series.

The extraction module 210 may identify a plurality of SQL operations generated for one or more objects associated with the transaction. In this specification, the SQL operation may mean a predetermined type of operation created by an SQL. The SQL operation may include, for example, a data manipulation language (DML) operation, a data definition language (DDL) operation, and/or a data control language (DCL) operation. Additionally, the extraction module 210 may organize the identified SQL operations according to a generation order and transfer the organized SQL operations to the writing module 220.

The writing module 220 may align the log records based on the order according to the generation times of the log records. For example, the writing module 220 may align the log records based on the system change number (SCN). That is, the writing module 220 may align the log records of the source database server 110 in time series. Accordingly, a log record having a precedent SCN may be written earlier than a log record having an SCN subsequent thereto. The writing module 220 may determine whether a previous SQL operation history for an object corresponding to an individual SQL operation exists in the CDC file based on an order in which the plurality of identified SQL operations occurs. In this specification, the CDC file may mean a file organized in the order of the transaction (operation) transferred from the source database server 110 to the target database server 120. The writing module 220 may determine the information to be written in the CDC file and write the determined information in the CDC file based on whether the previous SQL operation exists in the CDC file.

For example, the writing module 220 may determine whether the previous SQL operation history exists in the CDC file based on whether meta information for the object (e.g., table) corresponding to the SQL operation exists in the CDC file. Here, the meta information may include at least one of a table user information, a table name information, a column name information, a column order information, and a column type information. Further, the writing module 220 may determine whether the previous SQL operation history exists in the CDC file based on whether a DML operation or DDL operation is previously performed for the object corresponding to the SQL operation. The determination for the previous SQL operation history of the writing module 220 may be performed in the order in which the SQL operation occurs (e.g., according to a temporal sequential relationship of the SCN) for all objects associated with the transaction.

The writing module 220 may generate a meta information for a corresponding object using DD (Data Dictionary) information for the corresponding object when a previous SQL operation history isn't in the CDC file, and determine to not generate a meta information for the corresponding object when a previous SQL operation history is in the CDC file. Further, the writing module 220 may determine to write the meta information and SQL operation associated with the corresponding object on the CDC file when a meta information for the corresponding object is generated, and determine to write SQL operation associated with the corresponding object on the CDC file when a meta information for the corresponding object isn't generated.

The reading module 230 may transfer the read CDC file or information written in the CDC file to the transceiving module 240 to allow the CDC file to be transmitted to the target database server by reading the CDC file. The reading module 230 may convert the CDC file or the information written in the CDC file into a format suitable for the target database server 120.

The transceiving module 240 may provide communication functions of the database server 110 and 120 and/or the communication function with the client. For example, when the transceiving module 240 is located outside the source database server 110, the transceiving module 240 may receive the extracted log records from the source database server 110. The transceiving module 240 may allow communication between the database servers 110 and 120 by using a predetermined network and/or database link. The transceiving module 240 may receive an input from the client. For example, the transceiving module 240 may receive from the client requests related to storing, changing, and query of the data and building, changing, and query of the index. Additionally, the transceiving module 240 may allow information transfer between the database servers by a scheme of calling a procedure to the database server. Further, the transceiving module 240 may provide a function of transceiving predetermined data/information transferred between the database servers in association with database replication.

The transceiving module 240 may transmit the transferred CDC file or the information written in the CDC file to the target database server 120. The transceiving module 240 may convert the CDC file or the information written in the CDC file into a format suitable for the target database server 120 and transmit the converted format to the target database server 120.

The storage module 250 may store predetermined data stored in association with performing the CDC feature according to the embodiments of the present disclosure, such as storing the extracted log record. The storage module 250 may be included in the DBMS and/or the persistent storage. Additionally, the storage module 250 may perform storing associated with an update request. The storage module 250 may decide to store the data table and the index table. The storage module 250 may determine a storage location on the data table and a storage location on the persistent storage for data.

As illustrated in FIG. 2, the target database server 120 may include a transceiving module 310, a writing module 320, a reading module 330, a change and reflection module 340, and a storage module 350.

The transceiving module 310 may receive the CDC file or the information stored in the CDC file from the source database server 110 or the agent server 130. The transceiving module 310 may provide a communication function of the same type as the transceiving module 240 of the source database server 110.

The writing module 320 may write the CDC file received from the source database server 110 or the information on the CDC file in the CDC file of the target database server 120. For example, the writing module 320 may determine to use a file which is the same as the CDC file received from the source database server 110 as the CDC file thereof as it is or write information which is the same as the information on the CDC file in the CDC file. In an additional embodiment, when the CDC file received from the source database server 110 is adopted as it is, the writing module 320 in the target database server 120 may be replaced by the transceiving module 310.

The reading module 330 may read the CDC file which exists in the target database server 120. The reading module 330 may transfer the read CDC file to the change and reflection module 340. The reading module 330 may modify the CDC file according to the format of the target database server 120 and transfer the changed CDC file to the change and reflection module 340. The reading module 330 may read the CDC file in an order written by the source database server 110.

Additionally, the reading module 330 may determine data to be changed and reflected in the target database server 120 based on the read CDC file. In this case, the reading module 330 may perform an operation of comparing data reflected to the target database server 120 and data included in the read CDC file. As a result, the reading module 330 may control the change and reflection module 340 to reflect only minimum data to the target database server 120.

Additionally, the reading module 330 may determine whether the meta information corresponding to the target database server 120 exists by reading the meta information written in the CDC file.

The change and reflection module 340 may check whether the meta information for the object is written in the CDC file. The change and reflection module 340 may determine whether the meta information corresponding to the target database server 120 exists by reading the meta information written in the CDC file. The change and reflection module 340 may load the meta information onto the memory when the meta information does not exist and use the meta information which exists when the meta information exists as it is. That is, the change and reflection module 340 may determine whether to load the meta information based on whether the corresponding meta information is loaded to the memory of the target database server 120 and when the corresponding meta information exists, the change and reflection module 340 may determine to use the loaded corresponding meta information of the target database server 120 without loading the meta information written in the CDC file to the memory.

The change and reflection module 340 may read a SQL operation written on the CDC file, and generate a SQL statement corresponding to the SQL operation by using the meta information corresponding to the read SQL operation in the memory. Further, the change and reflection module 340 may allow the change data in the source database to be finally reflected to the target database server 120 by applying the generated SQL statement to the target database server 120.

For example, the change and reflection module 340 may initially recognize the meta data in the transferred CDC file and load the corresponding meta data to the memory and then recognize the next SQL operation in the CDC file and then generate the SQL statement for the corresponding SQL operation by using the loaded meta data. After reflecting the generated SQL statement to the target database server 120, the change and reflection module 340 may recognize a commit for the transaction in the corresponding CDC file and reflect the commit to the target database server 120.

FIG. 3 is a flowchart exemplarily showing a CDC method performed in a source database server (or agent server) according to an embodiment of the present disclosure.

Steps illustrated in FIG. 3 are just exemplary and additional steps may be present or some of the steps may be omitted. The steps illustrated in FIG. 3 may be performed in the source database server 110 or the agent server 130. Hereinafter, for convenience of description, it will be assumed and described that the steps illustrated in FIG. 3 are performed in the source database server 110.

The source database server 110 analyzes the log record including the information on the transaction processed by the source database server 110 to identify the SQL operations which occur for one or more objects associated with the transaction (410). When the data, the table, and/or the index are/is changed in the source database server 110 according to the transaction initiated by the client, the log record for the corresponding transaction may be written in the source database server 110. In this case, the source database server 110 may extract the change data by analyzing the log record written in the log buffer and/or log file in the source database server 110. For example, the source database server 110 may extract new changed data after most recently acquired/extracted change data as the change data when the DML is generated in a source table. As another example, the source database server 110 recognizes DDL for the corresponding table as the change data to extract the DDL as change data which should be reflected to the target database server 120 when the DDL for the source table is generated. Additionally, the source database server 110 may align the change data in time series based on SCN values of the change data.

The source database server 110 may determine whether the previous SQL operation history for the object corresponding to the individual SQL operation exists in the CDC file based on the order in which the plurality of identified SQL operations occurs (420). Then, the source database server 110 may determine the information to be written in the CDC file based on whether the previous SQL operation history exists in the CDC file (430). For example, when the source database server 110 extracts change data indicating operations for a first DB object, the source database server 110 may determine whether the DML or DDL operation is previously performed for the first DB object in the related art. In such an example, the source database server 110 may receive meta information (e.g., data dictionary (DD) information) for the first DB object from the memory if the DML or DDL operation is not previously performed for the first DB object. The source database server 110 may generate the meta information for the first DB object by using the DD information for the first DB object. The source database server 110 will not additionally generate the meta information because the meta information for the first DB object exists if the DML or DDL operation is previously performed for the first DB object. In the present disclosure, for example, the meta information may include at least one of a table user information, a table name information, a column name information, a column order information, and a column type information. In an embodiment, the source database server 110 may determine whether the previous SQL operation history for each object to be subjected to the corresponding SQL operation exists in the CDC file in the order in which the SQL operation occurs for all objects associated with a specific transaction.

The source database server 110 may write the determined information in the CDC file (440). In step 430, the meta information may be generated and it may be determined whether the generated meta information is to be written in the CDC file. In step 440, the source database server 110 may write both the meta information and the SQL operation information in the CDC file or write only the SQL operation information in the CDC file. In an embodiment, the source database server 110 may write meta information for the corresponding object on a front part of the CDC file ahead of the SQL operation information. Further, according to an embodiment of the present disclosure, when the first transaction is committed earlier than the second transaction, the source database server 110 may write the SQL operation included in the first transaction on a front part of the CDC file ahead of the SQL operation included in the second transaction. By the aforementioned writing rules, the source database server 110 and the target database server 120 may efficiently implement the CDC while writing both the meta information and the SQL operation information in a single file.

When the information is written according to the aforementioned writing rules, when the transferred CDC file is read in the target database server 120 and the corresponding file is applied to the target database server 120, meta information for a specific object may be first read and then the SQL statement corresponding to the SQL operation information related to the corresponding meta information may be easily created by using the corresponding meta information.

As described above, according to an embodiment of the present disclosure, since both the SQL operation information and the meta information may be written in the single CDC file, the CDC may be implemented by an efficient scheme compared with an embodiment in which a separate file separately managing only the meta information exists. For example, in the case of an embodiment in which only the SQL operation information is written in the CDC file and a separate file of writing and managing the meta information exists, the meta information for all objects should be stored in a file of writing the meta information. Furthermore, when the DDL occurs in the case of separately managing only the meta information, the meta information should be modified, and as a result, there is no choice but to stop working on the database server may be referred as so-called "Stop The World". In this case, since the meta information is managed as a meta file from the perspective of the target database server 120, a meta file storing meta information for all objects should be loaded to the memory thereof. Accordingly, according to the embodiment, there is a disadvantage in that a usage of the memory is maximized. However, according to an embodiment of the present disclosure, when the meta information and the SQL operation information are managed as one file, data latency may also be minimized in implementing the CDC while reducing the memory usage between the source database server 110 and the target database server 120. According to an embodiment of the present disclosure, since only meta information for the table in which the DML or DDL occurs is written in one CDC file, the memory usage may be significantly reduced. Moreover, according to an embodiment of the present disclosure, since memory loading is performed in units of meta data for a specific table and the meta data for the specific table is loaded to the memory and then the SQL operation for the corresponding specific table is written, a factor of performance degradation may be eliminated in implementing the CDC in the database server.

The source database server 110 may determine to transmit the CDC file to the target database server 120 (450). The communication between the source database server 110 and the target database server 120 may be performed by a predetermined type of communication network and/or a predetermined type of dblink.

FIG. 4 is a flowchart exemplarily showing a CDC method performed in a source database server (or agent server) according to an embodiment of the present disclosure.

Steps illustrated in FIG. 4 are just exemplary and additional steps may be present or some of the steps may be omitted. The steps illustrated in FIG. 4 may be performed in the source database server 110 or the agent server 130. Hereinafter, for convenience of description, it will be assumed and described that the steps illustrated in FIG. 4 are performed in the source database server 110.

FIG. 4 exemplarily illustrates embodiments for a case where a DML operation is performed and embodiments for a case where a DDL operation is performed.

As illustrated in FIG. 4, the source database server 110 analyzes the log record including the information on the transaction processed by the source database server 110 to identify the SQL operations which occur for one or more objects associated with the transaction (510). When the data, the table, and/or the index are/is changed in the source database server 110 according to the transaction initiated by the client, the log record for the corresponding transaction may be written in the source database server 110. In this case, the source database server 110 may extract the change data by analyzing the log record written in the log buffer and/or log file in the source database server 110. For example, the source database server 110 may extract new changed data after most recently acquired/extracted change data as the change data when the DML is generated in a source table. As another example, the source database server 110 recognizes DDL for the corresponding table as the change data to extract the DDL as change data which should be reflected to the target database server 120 when the DDL for the source table is generated. Additionally, the source database server 110 may align the change data in time series based on SCN values of the change data.

The source database server 110 may determine the type of each of the plurality of identified SQL operations (520). For example, the source database server 110 may determine whether each of the plurality of identified SQL operations is the DML operation or DDL operation. As described above, a scheme of writing the information in the CDC file may depend on the type of SQL operation.

When it is decided that the type of SQL operation is the DML operation, the source database server 110 may decide that whether the previous SQL operation history for the object corresponding to the DML operation exists needs to be determined in step 530 (530). Then, the source database server 100 may determine whether the previous SQL operation history exists in the CDC file.

When it is determined that the previous SQL operation history exists in the CDC file, the source database server 110 may generate the meta information for the corresponding object by using the DD information for the corresponding object (550). When it is decided that the previous SQL operation history does not exist in the CDC file, the source database server 110 may decide to use the existing generated meta information without generating the meta information for the corresponding object (550).

Then, the source database server 110 may decide to write the SQL operation related to the corresponding object and the generated meta information in the single CDC file when the meta information for the corresponding object is generated (560). Further, the source database server 110 may decide to write the SQL operation in the single CDC file when determining that the generation of the meta information for the corresponding object is not required.

Then, the source database server 110 may decide to transmit the CDC file to the target database server 120 (570).

Referring back to step 520, when it is decided that the type for the plurality of identified SQL operations is the DDL type, the corresponding object should be newly modified according to the DDL operation into which the DDM information is input according to the characteristics of the DDL operation. Accordingly, when it is decided that the type of SQL operation is the DDL type, the source database server 110 may decide not to determine whether the previous SQL operation history for the object corresponding to the DDL operation that exists in the CDC file (540). Then, the source database server 110 may decide to generate the meta information for the object corresponding to the DDL operation and write the generated meta information in the CDC file, based on the input DDL operation (540). In an embodiment, the meta information corresponding to the DDL operation may be written at a position subsequent to writing positions of other SQL operations performed before the DDL operation in the CDC file. Then, the source database server 110 may decide to transmit the CDC file in which the information is written to the target database server 120 (570).

FIG. 5 is a flowchart exemplarily showing a CDC method performed in a target database server 120 (or agent server 130) according to an embodiment of the present disclosure.

Steps illustrated in FIG. 5 are just exemplary and additional steps may be present or some of the steps may be omitted. The steps illustrated in FIG. 5 may be performed in the target database server 120 or the agent server 130.

Hereinafter, for convenience of description, it will be assumed and described that the steps illustrated in FIG. 5 are performed in the target database server 120.

As illustrated in FIG. 5, the target database server 120 may receive the CDC file from the source database server 110 (1010). The target database server 120 may receive the CDC file generated by the source database server 110 and apply the received CDC file to the target database server 120. The communication between the source database server 110 and the target database server 120 may be performed by a predetermined type of communication network and/or a predetermined type of dblink.

The target database server 120 reads the meta information written in the received CDC file to determine whether the meta information corresponding to the target database server 120 exists in the memory (1020). The CDC file may be read by the target database server 120 in the order of being written by the source database server 110. Accordingly, the target database server 120 reads the CDC file written according to a predetermined writing rule in the source database server 110 in the writing order and performs corresponding operations in the read order, thereby reducing the memory usage and performing a CDC operation without latency.

The target database server 120 may load the meta information written on the CDC file into the memory, when there isn't the corresponded meta information (1030). Further, the target database server 120 may decide to use the existing meta information without newly loading the meta information written on the CDC file when there is the corresponded meta information (1030). For example, when meta information for a specific table is loaded to the memory of the target database server 120 in advance, the meta information need not be newly loaded to the memory, and as a result, a change data reflecting operation to the target database server 120 may be performed by using the existing loaded meta information.

The target database server 120 may read the SQL operation written on the CDC file in order and generate the SQL statement corresponding to the SQL operation by using the meta information on the memory corresponded to the read SQL operation (S1040). The SQL statement generated by the target database server 120 may mean an SQL statement for generating the SQL operation performed by the source database server 110. The target database server 120 may automatically reflect the change data to the DB thereof by performing the same SQL operation as the SQL operation performed by the source database server 110 by using the SQL operation information and the meta information written on the CDC file.

Then, the target database server 120 may apply the generated SQL statement to the target database server. Through the aforementioned scheme, the change data corresponding to the SQL operation automatically performed by the source database server 110 may be reflected to the target database server 120.

As described above, meta information for an object in which the SQL operation occurs among objects of the source database server 110 may be written on the CDC file which the target database server 120 uses for reflecting the change data to the DB thereof. By such a scheme, the target database server 120 need not load meta information for all objects into the memory thereof and loads only meta information for objects related to the change data in the source database server 110 to the memory, thereby significantly reducing the usage of the memory in the database server.

FIG. 6 schematically illustrates CDC operations performed in a database system according to an embodiment of the present disclosure. In FIG. 6, operations performed between the source database server 110 and the target database server 120 are exemplarily expressed.

As illustrated in FIG. 6, the source database server 110 may include a source DBMS 610 and a source processor 620. The source DBMS 610 may be operated by the source processor 620 on the memory of the source database server 110.

Here, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by the processor as described above. The memory may store predetermined type of data such as the change data. Alternatively, the memory may store a data table including a data value. In an embodiment of the present disclosure, the change data and/or the data value of the data table may be written on the persistent storage from the memory. In an additional aspect, the memory may include a buffer cache and data may be stored in a data block of the buffer cache. The data may be written on the persistent storage by a background process.

The persistent storage in this specification means a non-volatile storage medium which may consistently store predetermined data, such as a magnetic disk, an optical disk, and a magneto-optical storage device and a storage device based on a flash memory and/or a battery-backup memory. The persistent storage may communicate with the processors and the memories of the database servers 110 and 120 through various communication means. In an additional embodiment, the persistent storage may be positioned outside the database servers 110 and 120 to communicate with the database servers 110 and 120.

The DBMSs 610 and 710 as a program for permitting the database servers 110 and 120 to perform operations including retrieval, insertion, modification, and/or deletion of required data may be implemented by processors 620 and 720 in the memories of the database servers 110 and 120 as described above. Further, the source DBMS 610 may decide to generate, manage, and store the redo log for the transaction generated in the source database server 110. The source processor 620 may extract and analyze the redo log stored to implement the CDC operation (630), write corresponding contents on a CDC file 670, read the CDC file 670 (650), and transmit the read CDC file to the target database server 120 through a network 140 (660). The extraction (630), writing (640), reading (650), and transmitting (660) operations of the source processor 620 may correspond to the operations performed by the extraction module 210, writing module 220, reading module 230, and transceiving module 240 in FIG. 2, respectively as described above. Additionally, the extraction (630), writing (640), reading (650), and transmitting (660) operations may be performed by individual threads, respectively. Further, a plurality of operations among the extraction (630), writing (640), reading (650), and transmitting (660) operations may be performed by one thread. Further, the extraction (630), writing (640), reading (650), and transmitting (660) operations may be performed by individual processors, respectively or one processor may perform a plurality of operations among the operations. Hereinafter, for convenience of description, the CDC features according to the embodiments of the present disclosure will be described by assuming that one processor performs one module operation.

In an embodiment of the present disclosure, when a commit operation for the transaction is performed, a CDC operation in the source processor 620 may be initiated. For example, the source processor 620 may perform the extraction operation (630) when the commit operation of the traction is performed. As another example, when commit operations of a predetermined number of times are performed (e.g., when the commit operations for two transactions are performed), the source processor 620 may initiate the CDC operations for a plurality of transactions related to the corresponding commit operations. In another embodiment, the CDC operation of the source processor 620 may be initiated according to a predetermined time period or a predetermined SCN period.

As illustrated in FIG. 6, transactions 680 for T1 and T2 objects may be input from the source DBMS 610. The transactions 680 may include a first transaction and a second transaction. The first transaction may include a Delete operation and a Commit operation for the T1 object. The second transaction may include an Insert operation for the T1 object and an Update operation and the Commit operation for the T2 object. The SQL operations 680 performed in the source DBMS 610 may be aligned in time series and in units of transactions based on a time when the Commit operation is performed. In FIG. 6, since the Commit operation for the first transaction is performed earlier than the Commit operation for the second transaction, the SQL operations for the first transaction may be disposed ahead of the SQL operations for the second transaction.

The source processor 620 (e.g., extraction (630) thread) may extract the Delete operation and the Commit operation for the T1 object in the redo log and align the operations in a chronological order and transfer the Delete and Commit operations to, for example, the read (640) thread. The read (640) thread may check the Delete operation (i.e., Delete T1) for the T1 object disposed first and determine whether the previous SQL operation history for the T1 object exists in the CDC file 670. As an example, the read (640) thread may determine whether previous DML or DDL for the T1 object is performed. As illustrated in FIG. 6, since the previous SQL operation is not performed for the T1 object, the read (640) thread may generate meta information (i.e., T1 DD) for T1 by using data dictionary (DD) information held on the memory. Then, the read (640) thread may write the T1 DD which is the meta information for T1 and the Delete T1 which is the Delete operation for T1 in the CDC file 670. In this case, the T1 DD as the meta information may be written on a front part of the CDC file ahead of the Delete T1 as the SQL operation information. Additionally, the read (640) thread may write the commit operation for the T1 object on the CDC file 670. In this case, the commit operation may be written on a rear part behind a part on which the Delete T1 is written in the CDC file 670.

In an embodiment of the present disclosure, the extraction (630) thread may extract the Insert operation for the T1 object, the Update operation for the T2 object, and the Commit operation for the second transaction included in the second transaction in the redo log. The extraction (630) thread may be arranged in the order of Insert T1, Update T2, and the Commit operation according to the occurrence order of the SQL operations. Since the second transaction is committed after the first transaction, among the SQL operations, 680 performed in the source DBMS 610, SQL operations related to the first transaction among the SQL operations 680 performed in the source DBMS 610 may be aligned to be arranged before SQL operations related to the second transaction. The read (640) thread will read the operations related to the second transaction after reading and processing Delete T1 and the Commit operation for the first transaction. The read (640) thread may read the Insert operation (i.e., Insert T1) for the T1 object and determine whether the DML, or DDL for the T1 object occurs (i.e., whether the previous SQL operation history exists) in the CDC file 670. Since the DD information for the T1 object is written on the CDC file 670 in processing the operations (i.e., Delete T1) related to the first transaction, the read (640) thread will determine that the previous SQL operation history for the T1 object exists in the CDC file 670. In such a situation, the read (640) thread may write the Insert operation (i.e., Insert T1) for the T1 object at a next writing position in the CDC file 670 without generating the meta information for the T1 object. Then, the read (640) thread may recognize the Update operation for the T2 object. The read (640) thread will determine whether the previous SQL operation exists for the T2 object by checking the CDC file 670, and since the previous SQL operation does not exist, the meta information (i.e., T2 DD) for the T2 object may be generated by using the DD information for the T2 object stored in the memory. Then, the read (640) thread may write the meta information for the T2 object at the next position in the CDC file 670. Then, the read (640) thread may write the Update operation (i.e., Update U2) for the T2 object at a position subsequent to the position on which the meta information for the T2 object is written. Additionally, the read (640) thread may write the commit operation for the T2 object on the CDC file 670. In this case, the commit operation may be written on a rear part behind a part on which the Update T2 is written in the CDC file 670. Information 690 may be written on the CDC file 670 based on commit times for the transactions and occurrence times of the operations by the aforementioned scheme. Since both the meta information and the SQL operation information may be written on the single CDC file 670 by such a scheme, the CDC may be implemented by an efficient scheme. Further, since only meta information in which the commit occurs may be loaded to the memory in the source database server 110 and the information 690 is written on the CDC file 670 in the order following the writing rule according to the embodiments of the present disclosure, the target database server 120 may easily reflect change data to the DB thereof while reading the information in the order in which the information is written on the single CDC file 670 created by the source database server 110. That is, meta information for an object in which the SQL operation occurs among objects of the source database server 110 may be written on the CDC file which the target database server 120 uses for reflecting the change data to the DB thereof. By such a scheme, the target database server 120 need not load meta information for all objects into the memory thereof and loads only meta information for objects related to the change data in the source database server 110 to the memory, thereby significantly reducing the usage of the memory in the database server.

In an additional aspect of the present disclosure, the client 110 and the database servers 120 and 130 or the database servers 120 and 130 may communicate with each other through a network (not illustrated). The network according to an embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. Further, the network in this specification may include a database link (dblink), and as a result, the source database server 110 and the target database server 120 (or agent server 130) communicate with each other through the database link to fetch data from another database server. As an example, the database link may include the database link from the source database server 110 to the target database server 120. The techniques described in this specification may also be used in other networks in addition to the aforementioned networks.

As illustrated in FIG. 6, the target database server 120 may include a target DBMS 710 and a target processor 720. The target DBMS 710 may be operated by the target processor 720 on the memory of the target database server 120. Description of hardware components and the target DBMS 710 of the target database server 120 is the same as the description of the hardware components and the source DBMS 610 of the source database server 110, so that the corresponding description will be omitted herein.

The target processor 720 receives the CDC file 670 to implement the CDC operation (730), writes the corresponding contents on the CDC file 770 thereof (740) (or uses the received CDC file 670 as a CDC file 770 thereof as it is), and reads the CDC file 770 (750) to reflect change data to the target DBMS 710 (760). The reception (730), writing (740), reading (750), and change/reflection (760) operations of the target processor 720 may correspond to the operations performed by the reception module 310, writing module 320, reading module 330, and change/reflection module 340 in FIG. 2, respectively as described above. Additionally, the reception (730), writing (740), reading (750), and change/reflection (760) operations may be performed by individual threads, respectively. Further, a plurality of operations among the reception (730), writing (740), reading (750), and change/reflection (760) operations may be performed by one thread. Further, the reception (730), writing (740), reading (750), and change/reflection (760) operations may be performed by individual processors, respectively or one processor may perform a plurality of operations among the operations. Hereinafter, for convenience of description, the CDC features according to the embodiments of the present disclosure will be described by assuming that one processor performs one module operation.

The target processor 720 (e.g., reception (730) thread) of the target database server 120 may receive the CDC file 670 from the source database server 110. The target processor 720 of the target database server 120 may similarly write the received CDC file 670 on the CDC file 770 thereof or use the received CDC file 670 as the CDC file 770 thereof. The read (750) thread of the target processor 720 may read information 780 written on the CDC file 770 and transfer the read information 780 to the change/reflection (760) thread.

The change/reflection (760) thread reads the meta information called T1 DD first written on the CDC file 770 to determine whether the DD meta information for the T1 object exists in the memory thereof. When the meta information for the T1 object does not exist in the memory of the target database server 120, the target database server 120 may load the T1 DD meta information to the memory thereof. Then, the change/reflection (760) thread may check Delete T1 written after the information called T1 DD in the CDC file 770. The change/reflection (760) thread may automatically generate an SQL statement for performing the Delete operation for the T1 object by using the T1 DD meta information loaded onto the memory and reflect the generated SQL statement to the target DBMS 710. Then, the change/reflection (760) thread may check the Commit and reflect the Commit to the target DBMS 710. Then, the change/reflection (760) thread may check Insert T1 as information written next in the CDC file 770. Since the Insert operation is the operation for the T1 object, the change/reflection (760) thread may generate an SQL statement for performing the Insert operation for the T1 object by using the meta information for the T1 object loaded on the memory.

The change/reflection (760) thread may check T2 DD meta information written at the next position in the CDC file 770. The change/reflection (760) thread may examine whether the DD meta information for the T2 object exists in the memory of the target database server 120. The change/reflection (76) thread may load the meta information (i.e., T2 DD meta information) for the T2 object to the memory of the target database server 120 when it is decided that there isn't the meta information for the T2 object loaded to the memory thereof. Then, the change/reflection (760) thread may recognize Update T2 written at the next position in the CDC file 770. The change/reflection (760) thread may load the meta information for the T2 object on the memory and automatically generate an SQL statement corresponding to the Update operation for the T2 object by using the meta information. Then, the change/reflection (760) thread may reflect the SQL statement for performing the Update operation for the T2 object to the DBMS 710 thereof. Then, the change/reflection (760) thread may check the Commit and reflect the Commit to the DBMS 710.

According to an embodiment of the present disclosure, the writing rule for the CDC file may include writing meta information for a specific object in a first order and subsequently writing DML or DDL for a specific table. According to an embodiment of the present disclosure, the writing rule for the CDC file decides an order of transactions to be written according to an order in which the commit occurs and writes the meta information before the SQL operation information, and as a result, the CDC may be easily achieved through the transfer of the single CDC file. According to an embodiment of the present disclosure, the memory usage may be significantly reduced as compared with a configuration of implementing the CDC while loading all meta information to the memory (i.e., a configuration of managing the meta information and the SQL operation information by individual files) and a situation in which the operation of the database server stops in a situation such as DDL occurrence may be prevented. Moreover, the CDC features according to an embodiment of the present disclosure may significantly reduce the memory usage as compared with the existing structure in reflecting the DML or DDL for a plurality of tables.

In CDC implementation schemes of separately managing the meta information and the SQL operation information, separate files of writing meta information for all objects are shared while being transmitted/received between both database servers. Accordingly, the implementation schemes request that the target database server 120 also retains DD information for an object in which DML does not occur in the memory. That is, the target database server 120 should retain DD information for as many objects as possible in the memory according to all objects (e.g., tables) or memory capacities. Further, in this case, when the DDL occurs, even though a file in which the meta information is written should be manually generated or transmitted or the file in which the meta information is written is automatically transmitted, the source database server 110 should wait in an idle state until transmission of a meta file is completed. However, in the CDC implementation schemes according to an embodiment of the present disclosure, a meta file storing the meta information need not be separately generated and transmitted and an idle state of the source database server 110 is not caused. Accordingly, the CDC implementation schemes according to an embodiment of the present disclosure may allow real-time DDL synchronization. Furthermore, in the CDC implementation schemes according to an embodiment of the present disclosure, since the DD information for a table in which DML occurs is managed, the memory may be efficiently managed by the target database server 120. For example, since DD for one CDC file is managed with respect to reading/writing and DD for a DML occurrence object is managed with respect to change/reflection, more resource-efficient CDC implementation may be possible.

FIG. 7 schematically illustrates CDC operations performed in a database system according to an embodiment of the present disclosure.

The embodiment illustrated in FIG. 7 is obtained by adding the DDL feature to the embodiment illustrated in FIG. 6 and common contents to the embodiments in FIG. 6 will be omitted below for convenience of description. For example, extraction (830), writing (840), reading (850), and transmission (860) operations in FIG. 7 may correspond to the extraction (630), writing (640), reading (650), and transmission (660) operations in FIG. 6, respectively. Further, reception (930), writing (940), reading (950), and change/reflection (960) operations in FIG. 7 may correspond to the reception (730), writing (740), reading (750), and change/reflection (760) operations in FIG. 6, respectively. Further, a source DBMS 810, a source processor 820, a target DBMS 910, and a target processor 920 in FIG. 7 may correspond to the source DBMS 610, the source processor 620, the target DBMS 710, and the target processor 720 in FIG. 6, respectively.

As illustrated in FIG. 7, transactions 880 may be input into the source DBMS 810. In the example in FIG. 7, the transactions 880 may include a first transaction including Insert T 1, Update T2, and Commit, a second transaction including Delete T3 and Commit, and a third transaction including DDL T1. The source processor 820 may arrange operations included in the input transactions in an occurrence time order as shown in reference number 880. For example, an extraction (830) thread analyzes redo logs for the transactions which occur in the source DBMS 810 to extract and align information on changed data as indicated by reference numeral 880.

Since the commit time of the second transaction is earlier than the commit time of the first transaction even though the second transaction starts later than the first transaction, the source processor 820 may write the SQL operations related to the second transaction in the CDC file 870 earlier than the SQL operations related to the first transaction. The SQL operations related to the transactions may be written on the CDC file 870 according to a time order in which the SQL operations occur in the transaction.

As illustrated in FIG. 7, the writing (840) thread may recognize that the Delete operation for T3 object is performed in the second transaction. The writing (840) thread may check whether the meta information for the T3 object exists in the CDC file 870. That is, the writing (840) thread may check whether the previous SQL performing history for the T3 object is in the CDC file 870. Since the meta information for the T3 object does not exist, the writing (840) thread uses the DD information loaded onto the memory to generate the meta information for the T3 object and write the generated meta information (i.e., T3 DD #1) on the CDC file 870. Then, the writing (840) thread may write the Delete operation (i.e., Delete T3) for the T3 object on the CDC file 870. Additionally, the writing (840) thread may write the commit operation for the second transaction on the CDC file 870. A writing position of the commit operation is a rear part behind the writing position of Delete T3.

The writing (840) thread may start writing on the CDC file 870 for the first transaction after completing writing on the CDC file 870 for the second transaction. The writing (840) thread may check Insert T1 and examine whether the meta information for the T1 object exists in the CDC file 870. As illustrated in FIG. 7, since only the meta information for the T3 object is currently written on the CDC file, the writing (840) thread may generate the meta information for the T3 object by using the DD information (e.g., DD information for the T3 object) of the memory. Then, the writing (840) thread may write the meta information (i.e., TT DD #1) for the generated T3 object on the CDC file 870. Then, the writing (840) thread may write the previously checked Insert T1 operation on a rear position behind the position on which the meta information is written in the CDC file 870. The writing (840) thread may check an Update T2 operation which is the SQL operation which occurs next to Insert T1 in the first transaction. The writing (840) thread may examine whether the meta information for the T2 object exists in the CDC file 870. Since the meta information for the T3 object and the meta information for the T2 object is currently written on the CDC file 870, the writing (840) thread may determine that the meta information for the T2 object does not exist. In this case, the writing (840) thread may generate the meta information for the T2 object by referring to the DD information for the T2 object loaded onto the memory. Then, the writing (840) thread may write the meta information for the generated T2 object on the CDC file 870. The meta information of the T2 object may be written in a position subsequent to the writing position of Insert T1 written just before. Then, the writing (840) thread may subsequently write the Update T2 operation corresponding to the written meta information on the CDC file 870. Then, the writing (840) thread may write the commit operation for the first transaction on the CDC file 870. The writing position of the commit operation is a rear part behind the writing position of Update T2.

The writing (840) thread may check a third transaction (including DDL T1) after reflecting all operations for the first transaction. The writing (840) thread checks the type of SQL operation to decide that the type of SQL operation is a DDL type. That is, when it is decided that the type for SQL operation is a DML operation, the writing (840) thread may decide to determine whether the previous SQL operation history for the object corresponding to the DML operation is in the CDC file 870. Further, when it is decided that the type for the SQL operation is the DDL operation, the writing (840) thread may generate a meta information for an object corresponded to the DDL operation, based on the DDL operation, without determining whether the previous SQL operation history for the object corresponding to the DDL operation is in the CDC file 870, and decide to write the generated meta information on the CDC file. Accordingly, the writing (840) thread may generate the meta information corresponding to the DDL operation for T1 and write DDL T1 on the CDC file 870 as illustrated in FIG. 7.

The reading (850) thread may read the CDC file 870 written by the writing (840) thread and transfer the read CDC file 870 to the transmission (860) thread. The transmission (860) thread may transmit the transferred CDC file 870 to the target database server 120 through the network 140.

The target processor 920 of the target database server 120 may receive the CDC file 870 by the reception (930) thread. The writing (940) thread of the target processor 920 may write information written on the CDC file 870 received by the CDC file 970 thereof in the same order. Alternatively, the writing (940) thread of the target processor 920 may use the received CDC file 870 as the CDC file 970 thereof as it is. Accordingly, the CDC file 970 of the target database server 120 may include information in an order in which the information is written on the source database server 110 as indicated by reference numeral 980.

The reading (950) thread of the target database server 120 may transfer information 980 written on the CDC file 970 to the change/reflection (920) thread and the change/reflection (920) thread reflects the transferred information to the target DBMS 910 to perform synchronization of the target DBMS 910 and the source DBMS 810. The change/reflection (920) thread may perform reflection to the target DBMS 910 in the writing order of the information expressed by reference numeral 980. Meta information for a specific SQL operation may be first written on the CDC file 970 and the corresponding SQL operation information may be then written and since the corresponding meta information is written for the DDL operation, the target database server 120 need not load meta information for a lot of objects to the memory thereof and may process reflection by loading the meta information for the object in which the DML occurs. A specific reflection scheme is described in association with FIG. 6, so that a description thereof will be omitted in FIG. 7.

FIG. 8 is a block diagram of an exemplary computing device for implementing a CDC solution according to an embodiment of the present disclosure.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Any medium accessible by a computer may be a computer readable medium and the computer readable medium may include a computer readable storage medium and a computer readable transmission medium. The computer readable storage includes volatile and nonvolatile media and movable and non-movable media. The computer readable storage media include volatile and non-volatile media and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally include information transfer media that implement the computer readable command, the data structure, the program module, or other data in a carrier wave or a modulated data signal such as other transport mechanisms. The term "modulated data signal" means a signal acquired by configuring or changing at least one of the characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures that may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems that are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, possess, and/or transfer instruction(s) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. The appended method claims provide elements of various steps in a sample order, but the method claims are not limited to the presented specific order or hierarchical structure.

The description of the presented embodiments is provided so that those skilled in the art use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is coherent with the principles and new features presented herein.

MODE FOR INVENTION

Related contents in the best mode for carrying out the present disclosure are described as above.

INDUSTRIAL APPLICABILITY

The present disclosure relates to a database management system (DBMS), and more particularly, to change data capture (CDC).

The invention claimed is:

1. A computer program stored a non-transitory computer readable storage medium comprising encoded instructions, wherein when the computer program is executed by one or more processors, the computer program performs a method for Change Data Capture (CDC) by one or more processors, and the method comprises:
identifying a plurality of Structured Query Language (SQL) operations generated for one or more objects associated with a transaction by analyzing a log record including information about the transaction processed at a source database server;
determining whether a previous SQL operation history for an object corresponding to an individual SQL operation is in a CDC file;
determining information to write on the CDC file based on whether a previous SQL operation history is in the CDC file, wherein the determining comprises:
when there is the previous SQL operation history for the object corresponding to the individual SQL operation in the CDC file, determining to write the individual SQL operation on the CDC file without writing meta information related to Data Dictionary (DD) of the object; and
when there is no previous SQL operation history for the object corresponding to the individual SQL operation in the CDC file, determining to write the meta information related to the Data Dictionary of the object at a first portion of the CDC file and to write the individual SQL operation at a second portion of the CDC file, wherein the first portion precedes the second portion on the CDC file;
writing the determined information on the CDC file; and
deciding to send the CDC file to a target database server.

2. The computer program according to claim 1, the meta information comprises at least one of a table user information, a table name information, a column name information, a column order information and a column type information.

3. The computer program according to claim 1, the deciding whether the previous SQL operation history is in the CDC file is: deciding whether the previous SQL operation history is in the CDC file further based on whether DML (Data Manipulation Language) operation or DDL (Data Definition Language) operation is performed for an object corresponded to the SQL operation before.

4. The computer program according to claim 1, the deciding whether the previous SQL operation history is in the CDC file is: performed in the order in which the SQL operation occurred for entire objects associated with the transaction.

5. The computer program according to claim 1, the transaction includes a first transaction and a second transaction, and
writing a SQL operation included in the first transaction on a front part of the CDC file ahead of the SQL operation included in the second transaction when the first transaction is committed first before the second transaction.

6. The computer program according to claim 5, when the first transaction is associated with at least a first object and the second transaction is associated with a second object different from the first object, the writing the determined information on the CDC file is:
writing on the CDC file in the order that a meta-information for a first object generated according to the first transaction, SQL operation for a first object generated according to the first transaction, SQL operation for a first object generated according to the second transaction, a meta-information for a second object generated according to the second transaction, and SQL operation for a second object generated according to the second transaction.

7. The computer program according to claim 1, the SQL operation comprises at least one type of DML (Data Manipulation Language) operation and DDL (Data Definition Language) operation, and the method further comprises:
determining types for each of the identified plurality of SQL operations;
when it is determined that a type for SQL operation is a DML operation, determining to decide whether the previous SQL operation history for an object corresponding to the DML operation is in the CDC file; and
when it is determined that a type for the SQL operation is a DDL operation, generating a meta information for an object corresponded to the DDL operation, based on the DDL operation, without deciding whether a previous SQL operation history for an object corresponding to the DDL operation is in the CDC file, and determining to write a generated meta information on the CDC file.

8. A database server comprising one or more processors to implement Change Data Capture (CDC), the one or more processors perform operations of:
  identifying a plurality of Structured Query Language (SQL) operations generated for one or more objects associated with a transaction, according to analyze a log record including information about the transaction processed at a source database server;
  determining whether a previous SQL operation history for an object corresponding to an individual SQL operation is in a CDC file;
  determining information to write on the CDC file based on whether a previous SQL operation history is in the CDC file, wherein the determining comprises:
    when there is the previous SQL operation history for the object corresponding to the individual SQL operation in the CDC file, determining to write the individual SQL operation on the CDC file without writing meta information related to Data Dictionary (DD) of the object; and
    when there is no previous SQL operation history for the object corresponding to the individual SQL operation in the CDC file, determining to write the meta information related to the Data Dictionary of the object at a first portion of the CDC file and to write the individual SQL operation at a second portion of the CDC file, wherein the first portion precedes the second portion on the CDC file;
  writing the determined information on the CDC file; and
  deciding to send the CDC file to a target database server.

9. A computer program stored a non-transitory computer readable storage medium comprising encoded instructions, wherein when the computer program is executed by one or more processors the computer program performs a method for Change Data Capture (CDC) by one or more processors, and the method comprises:
  receiving a CDC file from a source database server;
  deciding whether there is a meta information corresponded to a target database server, accordingly to read a meta information written on the CDC file;
  loading a meta information written on the CDC file into a memory, when there isn't the corresponded meta information;
  reading a SQL operation written on the CDC file, and generating a SQL statement corresponding to the SQL operation by using the meta information corresponding to the read SQL operation in the memory; and
  applying the generated SQL statement to the target database server;
  wherein when there is the previous SQL operation history for an object corresponding to an individual SQL operation in the CDC file, the individual SQL operation is written on the CDC file without writing meta information related to Data Dictionary (DD) of the object; and
  when there is no previous SQL operation history for the object corresponding to the individual SQL operation in the CDC file, the meta information related to the Data Dictionary of the object is written at a first portion of the CDC file and the individual SQL operation is written at a second portion of the CDC file, wherein the first portion precedes the second portion on the CDC file.

10. The computer program according to claim 9, the CDC file is read at the target database server in the order written by the source database server.

11. The computer program according to claim 9, the deciding whether there is a meta information corresponded to the target database server is: deciding based on whether the corresponded meta database is in a memory of the target database server; and the method further comprises:
  when there is the corresponded meta database, determining to use the corresponded meta-database loaded to the target database server, without loading a meta information written on the CDC file into a memory.

12. The computer program according to claim 9, on the CDC file, a meta information for an object where the SQL operation occurs among objects of the source database server is written.

13. A database server comprising one or more processors to implement Change Data Capture (CDC), the one or more processors perform operations of:
  receiving a CDC file from a source database server;
  deciding whether there is a meta information corresponded to a target database server, accordingly to read a meta information written on the CDC file;
  loading a meta information written on the CDC file into a memory, when there isn't the corresponded meta information;
  reading SQL operation written on the CDC file and generating SQL statement corresponded to the SQL operation as use the meta information corresponded to the read SQL operation in the memory; and
  applying the generated SQL statement to the target database server,
  wherein when there is the previous SQL operation history for an object corresponding to an individual SQL operation in the CDC file, the individual SQL operation is written on the CDC file without writing meta information related to Data Dictionary (DD) of the object; and
  when there is no previous SQL operation history for the object corresponding to the individual SQL operation in the CDC file, the meta information related to the Data Dictionary of the object is written at a first portion of the CDC file and the individual SQL operation is written at a second portion of the CDC file, wherein the first portion precedes the second portion on the CDC file.

* * * * *